Aug. 16, 1932.  A. STANSFIELD  1,871,863
FURNACE
Filed Dec. 28, 1929  3 Sheets-Sheet 2

INVENTOR
ALFRED STANSFIELD.
By
ATTORNEY.

Aug. 16, 1932.  A. STANSFIELD  1,871,863
FURNACE
Filed Dec. 28, 1929    3 Sheets-Sheet 3

INVENTOR.
ALFRED STANSFIELD.
By
ATTORNEY.

Patented Aug. 16, 1932

1,871,863

UNITED STATES PATENT OFFICE

ALFRED STANSFIELD, OF WESTMOUNT, QUEBEC, CANADA

FURNACE

Application filed December 28, 1929. Serial No 417,234.

This invention relates to improvements in the method and apparatus employed in the furnace treatment of finely divided material and particularly in the reduction or deoxidation of ores containing metallic oxides.

The object of the invention is to provide a new and improved method and means whereby finely divided material may be treated in a furnace, which will overcome the difficulties and disadvantages of the present methods, which will utilize more completely and more economically the heat required for such treatment and the combustible matter employed during the treatment.

A further object is to provide such a method and means of simple, compact and durable construction requiring the minimum of mechanical power and attention, which will prevent the loss of heat to the greatest extent as compared with modern methods.

A further object is to provide a method and means whereby metallic oxides may be reduced or deoxidized without fusion and brought to a condition in which they will remain stable and not reoxidize.

A further object is to provide a method and means of reducing iron ores or the like preparatory to smelting in an electric furnace, as disclosed in my co-pending application Serial Number 349,107, filed 22nd, March 1929, issued February 25, 1930, No. 1,748,805.

A further object is to provide a method and means whereby a portion of the apparatus may be employed to generate fuel gas to be used in the heating of other portions without interfering with the continuous progress of the treatment.

Further objects will be set forth in the specification hereinafter.

The invention consists briefly in the use of a rectangular stack, having a series of vertical partitions therein.

Supported on these partitions and the side walls are a series of floors inclined alternately and extending from one of the walls to outlets at their lower edges above the upper portion of the floor beneath, the partitions having openings to form horizontal flues over the floors, and by-pass passages in the side walls connecting the horizontal flues, the whole adapted to provide a continuous passage downwards for the charge of material being treated, and an ascending channel of connected transverse flues for the combustion gases across the floors carrying the charge.

When combined with cooling apparatus the lower floor leads to passages in the cooling apparatus.

In order to generate gaseous fuel required in the heating of the charge, one or more floors may be provided with muffle covers to form gas producing chambers, the gas being drawn off through the side walls.

Reference is made to the accompanying drawings in which:—

Figure 1:
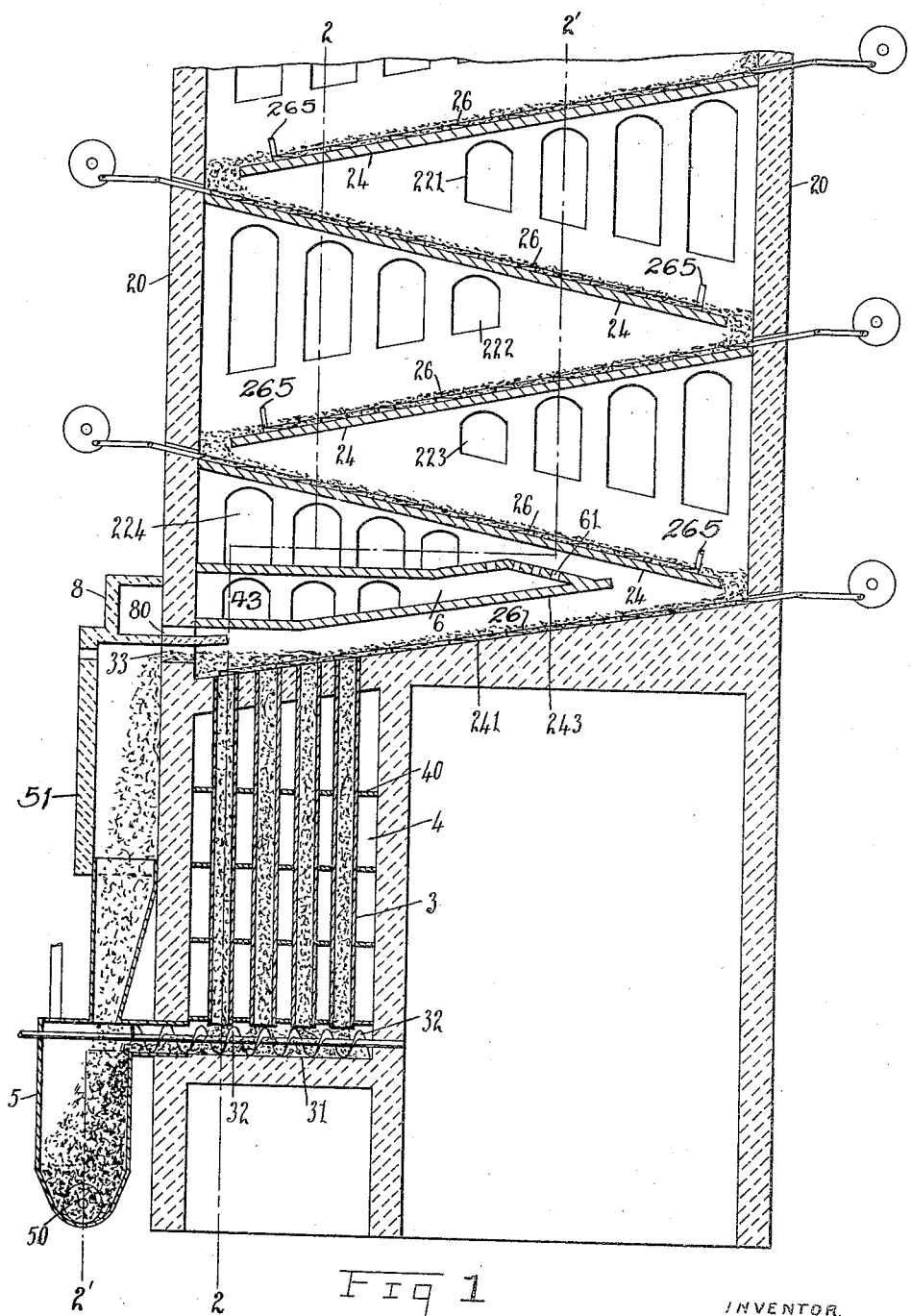
Fig. 1 is a vertical cross section showing cooling apparatus.

The apparatus employed takes the form of a rectangular stack having front and rear walls 20 and side walls 21.

A series of vertical partitions 22 parallel with the side walls 21 divides the stack into a series of vertical chambers.

Supported on ledges or brackets 23 on the walls 21 and partitions 22 are a series of inclined floors 24, which extend from one wall 20 to within a short distance of the opposite wall 20, thereby providing outlets at their lower edges through which the charge passes to the upper portion of the floor beneath.

Figure 2:
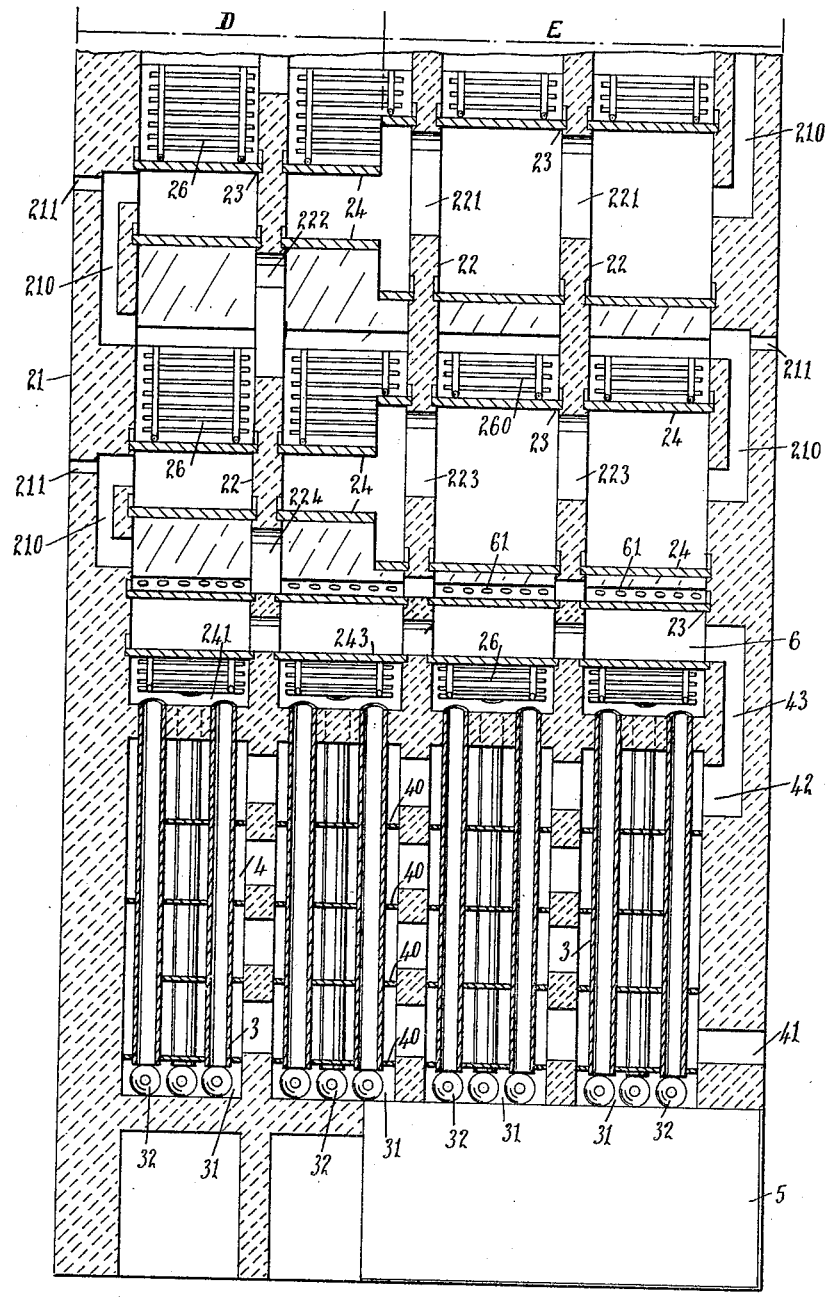
Fig. 2 is a vertical cross section in two parts—D, on the line 2—2 of Fig. 1. E, on the line 2'—2' of Fig. 1.

The partition walls 22 have openings 221, 222, 223 and 224 which form continuous horizontal flues between the side walls 21 over each floor 24. By-pass passages 210 in the side walls 21 connect the horizontal flues. In Figure 2 these by-pass passages connect the adjacent horizontal flues at alternate ends and provide a continuous channel for the gases to ascend through the stack. Openings 211 are provided to permit air and/or fuel to be fed into the transverse flues.

The top floor preferably forms a hopper and is usually mounted at a steeper angle than the other floors 24.

The walls 20 may be provided with slots for sliding gates whereby the flow of the charge may be held back on any floor. The hopper and sliding gates having been shown and described in U. S. Patent No. 1,748,805 above referred to, are not shown in the drawings hereto.

Figure 4:
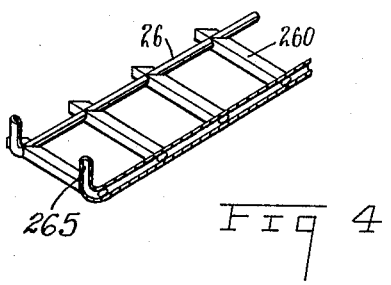
Fig. 4 shows details of the rakes.

A series of rakes 26 are mounted to reciprocate on the floors 24, which may be operated through the walls 20 by suitable means. These rakes 26 have cross bars 260 bevelled towards their driving ends, and the rakes may be air or water cooled when required. Figure 4 shows outlet 265 of air cooled rake.

Figure 3:
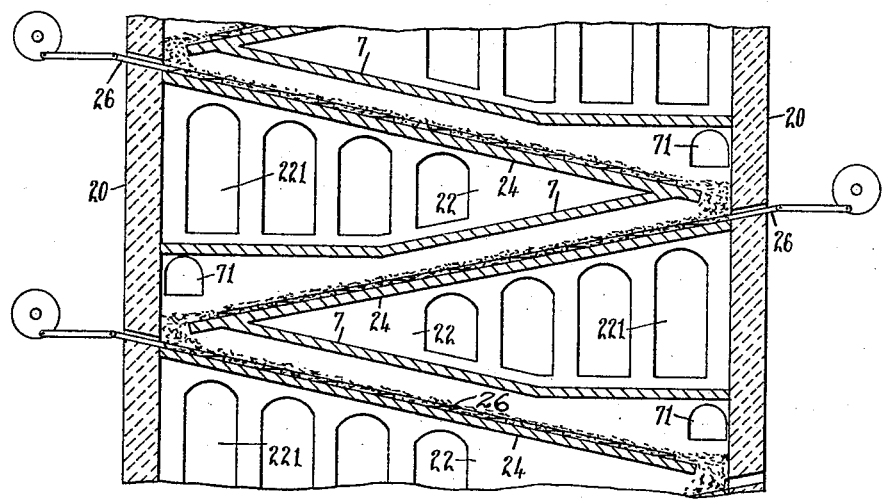
Fig. 3 is a vertical cross section of a portion of the stack showing the muffled gas producing chambers.

In Figure 3 there is shown intermediate floors 24 with muffle covers 7 forming gas producing chambers with a series of outlets 71 forming transverse flues to outlets in the side walls through which the gas generated may be drawn off. Such gas after purification may be fed to the manifold 8 or to any of the fuel inlets in the stack.

The lower floor 241 of the stack 2 leads to a cooling apparatus, comprising, a series of vertical tubes 3 in a chamber 4, the upper ends of the tubes 3 are open to receive the charge and the lower ends open into transverse channels 31 with water cooled conveyors 32 feeding into a container 5 from which the cooled charge may be removed by a suitable conveyor 50.

The chamber 4 may have vertical partitions corresponding to those of the stack above, with a series of horizontal baffle plates 40 and openings in the partitions to provide a continuous passage from an air inlet 41 to an outlet 42 in the by-pass passage 43.

The lower floor 241 has a baffle plate 243 over which is a transverse air chamber 6 into which the heated air from the by-pass passage 43 feeds. A series of small outlets 61 from the air chamber 6 feeds the heated air into the transverse flue above. A manifold 8 with inlets 80 to each compartment supplies fuel gas over the lower floor 241. An overflow outlet 33 to the lower floor 241 may be provided which may feed to the container 5, through the passage 51.

Employing apparatus constructed as above set forth and shown in the drawings, the operation of the invention is as follows:—

The mixture which receives a preliminary heating in the hopper, descends over the inclined floors in thin layers which are subjected to the heat at increasing temperatures of the upward current of gases until it reaches the lower floor.

The layers of mixture on the inclined floors are kept in motion by the rakes which reciprocate and which are protected from the heated gases by the covering of mixture, but which may be provided with suitable cooling means if necessary. A particular feature of the descent of the mixture from one floor to the one below, is that the layers are reversed and the top of the layer on one floor becomes the bottom of the layer on the next floor below. This frequent reversal results in a thorough and even heating of the mixture and in particular it obviates any tendency of the charge to become unmixed through the lighter ingredients (coal etc.) coming to the surface. In passing from one floor to the floor below the mixture provides a seal between the adjacent transverse flues.

Supplementary fuel such as oil, gas or pulverized coal may be introduced for the purpose of increasing the temperature of the ore charge in the stack, but care must be taken not to heat the charge to a temperature at which it becomes sticky before it enters the lower floor. The gaseous products of combustion pass upwards over and across the mixture on the floors in the stack and finally, after heating the top floor they pass off.

When one or more intermediate floors are provided with muffle covers to form gas producing chambers, the charge may contain an excess of carbonaceous content above that required in the ordinary operation of the furnace.

On the upper floors the flow of heated gases passing over the descending charge transversely, first dries the charge and then raises its temperature. The heat on and over the succeding floors then acts on the charge to reduce or deoxidize its metallic content and to produce gases from the mixture, which gases combine with those undergoing combustion in the transverse flues. Additional air and/or gaseous fuel is supplied where required to produce the desired temperature in the transverse flues. Oxidation of the carbon in the mixture or of deoxidized metal by the gases of combustion, is prevented by limiting the supply of air and by the design of the apparatus which tends to prevent intimate contact.

The effect of this treatment of the mixture is such that by the time it has reached the lower floor, it has been to a large extent reduced and deoxidized. The losses from unburnt gases and from wasted heat are reduced to a minimum and the cost of production is lowered.

One special advantage of this invention is that an uncarbonized fuel such as bituminous coal or even sawdust or chipped wood may be used instead of coke or charcoal, the raw fuel being carbonized in the stack and the volatile gases being burnt and thus serving as fuel to heat the stack.

In operation with a cooler the gases fed to the lower floor absorb heat from the mixture thereon and thereby assist in the cooling operation.

I claim:

1. In a heating device, a rectangular stack, having a series of vertical partitions therein, a series of floors alternately inclined at an angle less than that of the flow of the charge to be treated, extending from opposite walls with outlets at their lower edges to the upper portion of the floor beneath, and supported on the partitions and side walls, mechanism to advance the charge downwardly over the floors in thin layers at a controlled rate, openings in the partitions forming horizontal flues over the floors, and by-pass passages in the side walls connecting the horizontal flues alternately, adapted to provide a continuous channel for gases ascending the stack over the floors in succession.

2. In a heating device, a rectangular stack, having a series of vertical partitions therein, a series of floors alternately inclined at an angle less than that of the flow of the charge to be treated, extending from opposite walls with outlets at their lower edges to the upper portion of the floor beneath, and supported on the partitions and side walls, mechanism to advance the charge downwardly over the floors in thin layers at a controlled rate, openings in the partitions forming horizontal flues over the floors, and by-pass passages in the side walls connecting the horizontal flues alternately, having inlets therein to admit fuel and/or air to the flues, adapted to provide a continuous channel for gases ascending the stack over the floors in succession.

3. In a heating device, a rectangular stack, having a series of vertical partitions therein, a series of floors alternately inclined at an angle less than that of the flow of the charge to be treated, extending from opposite walls with outlets at their lower edges to the upper portion of the floor beneath, and supported on the partitions and side walls, openings in the partitions forming horizontal flues over the floors, and by-pass passages in the side walls connecting the horizontal flues alternately, adapted to provide a continuous channel for gases ascending the stack over the floors in succession, and mechanical means to feed the charge downwardly over the floors at a controllerd rate and with constant disturbance.

4. In a de-oxidizing furnace, a rectangular stack, a series of vertical partitions therein extending from back to front-walls, a series of floors alternately inclined at a low angle, extending between the said walls, with outlets at their lower edges to the upper portion of the floor beneath, and supported on the partitions and side walls, openings in the partitions forming horizontal flues across the floors and by-pass passages in the side walls which connect the horizontal flues alternately adapted to provide a continuous channel for the heated gases ascending over the charge on the floors, fuel gas inlets at the lower end of the bottom floor, means to advance the charge downwardly over the floors in a thin layer, a cooler below the bottom floor with outlets thereto.

5. In a de-oxidizing furnace, a rectangular stack, a series of vertical partitions therein extending from back to front walls, a series of floors alternately inclined at a low angle, extending between the said walls, with outlets at their lower edges to the upper portion of the floor beneath, and supported on the partitions and side walls, openings in the partitions forming horizontal flues across the floors, and by-pass passages in the side walls which connect the horizontal flues alternately adapted to provide a continuous channel for the heated gases ascending over the charge on the floors, fuel gas inlets at the lower end of the bottom floor, means to advance the charge over the floors in a thin layer, a cooler below the bottom floor with outlets thereto, having an air preheater and means to feed the preheated air therefrom into the lowest horizontal flue.

6. In a de-oxidizing furnace, a rectangular stack, a series of vertical partitions therein extending from back to front walls, a series of floors alternately inclined at a low angle, extending between the said walls with outlets at their lower edges to the upper portion of the floor beneath, and supported on the partitions and side walls, openings in the partitions forming horizontal flues across the floors and by-pass passages in the side walls which connect the horizontal flues alternately adapted to provide a continuous channel for the heated gases ascending over the charge on the floors, fuel gas inlets at the lower end of the bottom floor, means to advance the charge over the floors in a thin layer, a cooler below the bottom floor with outlets thereto, and an enclosed container with means to transfer the cool charge from the cooler to the container.

7. In a de-oxidizing furnace, a rectangular stack, a series of vertical partitions therein extending from back to front walls, a series of floors alternately inclined at a low angle, extending between the said walls with outlets at their lower edges to the upper portion of the floor beneath, and supported on the partitions and side walls, openings in the partitions forming horizontal flues across the floors, and by-pass passages in the side walls which connect the horizontal flues alternately adapted to provide a continuous channel for the heated gases ascending over the charge on the floors, fuel gas inlets to the by-pass passages and to the lower end of the bottom floor, mechanical means to advance the charge downwardly over the floors in a thin layer with continued disturbance, outlets in the bottom floor to a cooler below and overflow outlets leading to a container below the cooler.

8. In a de-oxidizing furnace, a rectangular stack, a series of vertical partitions therein extending from back to front walls, a series of floors alternately inclined at a low angle, extending between the said walls with outlets at their lower edges to the upper portion of the floor beneath, and supported on the partitions and side walls, openings in the partitions forming horizontal flues across the floors, and by-pass passages in the side walls which connect the horizontal flues alternately adapted to provide a continuous channel for the heated gases ascending over the charge on the floors, fuel gas inlets to the by-pass passages and to the lower end of the lower floor, means to advance the charge downwardly over the floors in a thin layer, outlets in the bottom floor to a cooler, comprising a series of vertical tubes on a chamber through which a cooling medium circulates, and a conveyor and enclosed container below the tubes.

9. In a de-oxidizing furnace, a rectangular stack, a series of vertical partitions therein parallel to the side walls, a series of floors alternately inclined at a low angle, extending from front to back walls with outlets at their lower edges to the upper portion of the floor beneath, and supported on the partitions and side walls, a series of reciprocating rakes operating on the floors, adapted to feed the charge over the floors at a controlled rate and with continuous agitation, openings in the partitions forming horizontal flues over the floors, and by-passages in the side walls which connect the horizontal flues alternately, inlets to the by-pass passages, adapted to supply fuel and/or air to the horizontal flues, inlets to the lower end of the bottom floor for fuel gas, and outlets for the treated material.

10. In a heating device, a rectangular stack, having a series of vertical partitions therein, a series of floors alternately inclined, extending from opposite walls with outlets at their lower edges to the upper portion of the floor beneath, and supported on the partitions and side walls, openings in the partitions forming horizontal flues over the floors, and by-pass passages in the side walls connecting the horizontal flues alternately, adapted to provide a continuous channel for gases ascending the stack over the floors in succession, certain floors having muffle covers extending between the side walls and from the lower edge of the floor above to the end wall and close to the floor below forming gas collecting chambers with outlets thereto.

11. In a heating device, a rectangular stack having a series of vertical partitions therein, a series of floors alternately inclined, extending from opposite walls with outlets at their lower edges to the upper portion of the floor beneath, and supported on the partitions and side walls, openings in the partitions forming horizontal flues over the floors, and by-pass passages in the side walls connecting the horizontal flues alternately, adapted to provide a continuous channel for gases ascending the stack over the floors in succession, certain intermediate floors having muffle covers extending between the side walls and from the lower edge of the floor above to the end wall and close to the floor below forming gas collecting chambers between the horizontal flues and the floors, having outlets thereto adapted to remove the gases given off in such chambers.

ALFRED STANSFIELD.